United States Patent Office 3,151,081
Patented Sept. 29, 1964

3,151,081
POLYPHENYL ETHER STABILIZERS
Wesley L. Archer, Midland, Mich., assignor to The Dow Chemical Company, Midland, Mich., a corporation of Delaware
No Drawing. Filed Sept. 5, 1961, Ser. No. 135,722
2 Claims. (Cl. 252—52)

The present invention relates to antioxidants and viscosity improvers for polyphenyl ether high-temperature, high-pressure lubricants. More particularly the present invention concerns polyphenyl ether compositions containing anthraquinone. This compound has been tested and found to reduce the degradation of the class of high-temperature, high-pressure lubricants having the general formula

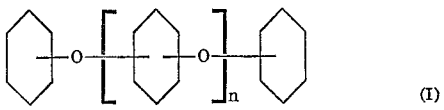

wherein $n$ is an integer from 2 to 6 or more. The employment of as little as 0.5% by weight of anthraquinone, based on the total weight of the total composition, will reduce degradation of the polyphenyl ether lubricants and thus reduce the viscosity increase of the lubricant composition due to such degradation. Good results are achieved when employing from about 0.5 to about 1.5% by weight of one of the anthraquinones.

It has been found that the viscosity of the class of polyphenyl ethers above illustrated increases when degradation occurs under high-temperature operations. Therefore, the increase in viscosity became a convenient measure of the degree of degradation which occurs in polyphenyl ethers during high-temperature tests wherein oxygen was introduced to simulate actual operation as a lubricant in various systems. The use of viscosity as a measure of degree of degradation and/or stabilization resolved itself readily to the following mathematical equation for percent improvement of stabilization:

$$\frac{V_1 - V_2}{V_1} \times 100 = \text{Percent stabilization}$$

$V_1$=Percent viscosity increase of unstabilized polyphenyl ether after oxidation treatment
$V_2$=Percent viscosity increase of stabilized polyphenyl ether after oxidation treatment The term "percent stabilization" is used hereinafter to have the meaning above assigned and is calculated as above set forth.

The following example illustrates the present invention but is not to be construed as limiting.

Example

A 50 g. sample of bis(phenoxyphenyl)ether containing 1% by weight of anthraquinone was heated on a steam bath to dissolve the anthraquinone and then was heated at 600° F. for 24 hours while bubbling 3 l. of air per hour through a sparger near the bottom of the liquid. The initial and final viscosity was determined by an Ostwald viscometer tube. An uninhibited check was treated in the same manner. The percent stabilization of the stabilized sample when compared to the check sample was 70. Other quinones such as benzoquinone, naphthaquinone, phenanthracenequinone and the like were found to accelerate degradation as evidenced by viscosity increases of 100% to 300% over that of the control.

I claim:
1. A high-pressure, high-temperature lubricant composition consisting essentially of a polyphenyl ether having the formula

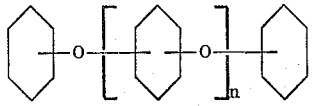

wherein $n$ represents an integer from 2 to 6, and, as the essential antioxidant and viscosity improver, an effective amount of anthraquinone.

2. A high-pressure, high-temperature lubricant composition consisting essentially of a polyphenyl ether having the formula

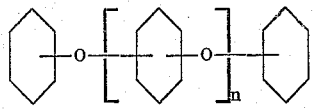

wherein $n$ represents an integer from 2 to 6, and from 0.5 to about 1.5% by weight, based on the total composition, of anthraquinone.

References Cited in the file of this patent
UNITED STATES PATENTS 2,497,097   Roberts et al.  ---------- Feb. 14, 1950
2,672,448   Newnan et al.  ---------- Mar. 16, 1954
2,940,929   Diamond  -------------- June 14, 1960